United States Patent
Chakraborty et al.

(10) Patent No.: US 9,669,363 B2
(45) Date of Patent: Jun. 6, 2017

(54) HIGH PERMEANCE MEMBRANES FOR GAS SEPARATIONS

(71) Applicant: UOP LLC, Des Plaines, IL (US)

(72) Inventors: Sudipto Chakraborty, Gurgaon (IN); Chunqing Liu, Arlington Heights, IL (US); Howie Q. Tran, Skokie, IL (US)

(73) Assignee: UOP LLC, Des Plaines, IL (US)

( * ) Notice: Subject to any disclaimer, the term of this patent is extended or adjusted under 35 U.S.C. 154(b) by 82 days.

(21) Appl. No.: 14/688,518

(22) Filed: Apr. 16, 2015

(65) Prior Publication Data

US 2016/0303521 A1 Oct. 20, 2016

(51) Int. Cl.

| | | |
|---|---|---|
| *B01D 71/64* | (2006.01) | |
| *B01D 53/22* | (2006.01) | |
| *B01D 67/00* | (2006.01) | |
| *B01D 69/12* | (2006.01) | |
| *B01D 61/36* | (2006.01) | |
| *B29C 47/00* | (2006.01) | |
| *B01D 69/08* | (2006.01) | |
| *B29K 77/00* | (2006.01) | |
| *B29L 31/00* | (2006.01) | |

(52) U.S. Cl.
CPC ........... *B01D 71/64* (2013.01); *B01D 53/228* (2013.01); *B01D 67/0009* (2013.01); *B01D 67/009* (2013.01); *B01D 67/0013* (2013.01); *B01D 69/08* (2013.01); *B01D 69/125* (2013.01); *B29C 47/0014* (2013.01); *B01D 61/362* (2013.01); *B01D 2053/224* (2013.01); *B01D 2256/16* (2013.01); *B01D 2256/24* (2013.01); *B01D 2256/245* (2013.01); *B01D 2257/504* (2013.01); *B01D 2257/7022* (2013.01); *B01D 2323/30* (2013.01); *B01D 2323/345* (2013.01); *B01D 2325/20* (2013.01); *B29K 2077/10* (2013.01); *B29L 2031/755* (2013.01)

(58) Field of Classification Search
CPC .. B01D 53/228; B01D 67/0013; B01D 69/08; B01D 69/125; B01D 71/64; C08G 73/1039; C08G 73/1042
See application file for complete search history.

(56) References Cited

U.S. PATENT DOCUMENTS

| | | | | |
|---|---|---|---|---|
| 4,983,191 A | * | 1/1991 | Ekiner | B01D 71/64 210/500.39 |
| 5,112,941 A | * | 5/1992 | Kasai | B01D 71/64 528/128 |
| 5,608,014 A | | 3/1997 | Ekiner | |
| 5,716,430 A | * | 2/1998 | Simmons | C08G 73/10 210/500.39 |
| 5,917,137 A | | 6/1999 | Ekiner | |
| 7,048,846 B2 | | 5/2006 | White et al. | |
| 8,016,124 B2 | | 9/2011 | Yates et al. | |
| 8,337,598 B2 | | 12/2012 | Yates et al. | |
| 9,327,248 B1 | * | 5/2016 | Liskey | B01D 71/64 |
| 2005/0268783 A1 | | 12/2005 | Koros et al. | |
| 2011/0290112 A1 | * | 12/2011 | Liu | B01D 53/228 95/54 |
| 2012/0323059 A1 | * | 12/2012 | Liu | B01D 71/64 585/818 |
| 2014/0290478 A1 | * | 10/2014 | Liu | B01D 71/64 95/47 |
| 2015/0005468 A1 | * | 1/2015 | Osman | B01D 71/64 528/170 |

OTHER PUBLICATIONS

Kim, I.C. et al., "Synthesis and Characterization of Soluble Random Copolyimides", Journal of Polymer Science, 74, 1999, pp. 272-277.*

* cited by examiner

*Primary Examiner* — Jason M Greene

(57) ABSTRACT

The present invention provides high permeance copolyimide membranes and methods for making and using these membranes for gas separations such as for hydrogen purification and for acid gas removal from natural gas. The random copolyimide polymers used to make the copolyimide membrane may be UV crosslinked to improve selectivity in separating mixtures of gases or in purifying liquids. The membranes may be fabricated into any known membrane configuration such as a flat sheet or a hollow fiber.

16 Claims, No Drawings

HIGH PERMEANCE MEMBRANES FOR GAS SEPARATIONS

BACKGROUND OF THE INVENTION

This invention relates to new high permeance copolyimide membranes and methods for making and using these membranes.

In the past 30-35 years, the state of the art of polymer membrane-based gas separation processes has evolved rapidly. Membrane-based technologies have advantages of both low capital cost and high-energy efficiency compared to conventional separation methods. Membrane gas separation is of special interest to petroleum producers and refiners, chemical companies, and industrial gas suppliers. Several applications of membrane gas separation have achieved commercial success, including $N_2$ enrichment from air, carbon dioxide removal from natural gas and from enhanced oil recovery, and also in hydrogen removal from nitrogen, methane, and argon in ammonia purge gas streams. For example, UOP's Separex™ cellulose acetate spiral wound polymeric membrane is currently an international market leader for carbon dioxide removal from natural gas.

Polymers provide a range of properties including low cost, permeability, mechanical stability, and ease of processability that are important for gas separation. Glassy polymers (i.e., polymers at temperatures below their $T_g$) have stiffer polymer backbones and therefore let smaller molecules such as hydrogen and helium pass through more quickly, while larger molecules such as hydrocarbons pass through more slowly as compared to polymers with less stiff backbones. Cellulose acetate (CA) glassy polymer membranes are used extensively in gas separation. Currently, such CA membranes are used for natural gas upgrading, including the removal of carbon dioxide. Although CA membranes have many advantages, they are limited in a number of properties including selectivity, permeability, and in chemical, thermal, and mechanical stability.

The membranes most commonly used in commercial gas and liquid separation applications are asymmetric polymeric membranes that have a thin nonporous selective skin layer that performs the separation. Separation is based on a solution-diffusion mechanism. This mechanism involves molecular-scale interactions of the permeating gas with the membrane polymer. The mechanism assumes that in a membrane having two opposing surfaces, each component is sorbed by the membrane at one surface, transported by a gas concentration gradient, and desorbed at the opposing surface. According to this solution-diffusion model, the membrane performance in separating a given pair of gases (e.g., $CO_2/CH_4$, $O_2/N_2$, $H_2/CH_4$) is determined by two parameters: the permeability coefficient (abbreviated hereinafter as permeability or $P_A$) and the selectivity ($\alpha_{A/B}$). The $P_A$ is the product of the gas flux and the selective skin layer thickness of the membrane, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficients because of a high solubility coefficient, a high diffusion coefficient, or because both coefficients are high. In general, the diffusion coefficient decreases while the solubility coefficient increases with an increase in the molecular size of the gas. In high performance polymer membranes, both high permeability and selectivity are desirable because higher permeability decreases the size of the membrane area required to treat a given volume of gas, thereby decreasing capital cost of membrane units, and because higher selectivity results in a higher purity product gas.

One of the components to be separated by a membrane must have a sufficiently high permeance at the preferred conditions or extraordinarily large membrane surface areas is required to allow separation of large amounts of material. Permeance, measured in Gas Permeation Units (GPU, 1 GPU=$10^{-6}$ cm$^3$ (STP)/cm$^2$ s (cm Hg)), is the pressure normalized flux and equals to permeability divided by the skin layer thickness of the membrane. Commercially available gas separation polymer membranes, such as CA, polyimide, and polysulfone membranes formed by phase inversion and solvent exchange methods have an asymmetric integrally skinned membrane structure. Integrally-skinned asymmetric membranes have a selective thin layer and a porous layer from the same membrane material and formed from the same membrane solution at about the same time. However, fabrication of defect-free high selectivity asymmetric integrally skinned gas separation membranes is difficult. The presence of nanopores or defects in the skin layer reduces the membrane selectivity. Sometimes the high shrinkage of the polymer membrane on cloth substrate during membrane casting and drying process results in unsuccessful fabrication of asymmetric integrally skinned polymeric gas separation membranes using phase inversion technique.

US 2005/0268783 A1 disclosed chemically cross-linked polyimide hollow fiber membranes prepared from a monoesterified polymer followed by final cross-linking after hollow fiber formation.

U.S. Pat. No. 8,016,124 disclosed a thin film composite membrane (TFC) comprising a blend of polyethersulfone and aromatic polyimide polymers. The TFC membrane has a layer of a blend of polyethersulfone and aromatic polyimide with a thickness from about 0.1 to about 3 microns.

U.S. Pat. No. 8,337,598 disclosed a TFC hollow fiber membrane with a core player and a sheath UV-crosslinked polyimide polymer layer.

U.S. Pat. No. 5,917,137 and U.S. Pat. No. 5,608,014 disclosed gas separation membranes prepared from blend of polyethersulfone with aromatic polyimides, polyamides, or polyamide-imides. The blending of polyethersulfone with aromatic polyimides can improve polyimide membrane properties such as processability, contaminant resistance, and selectivity. However, aromatic polyethersulfone is only miscible with very limited numbers of aromatic polyimides. The immiscibility of aromatic polyethersulfone with most of the aromatic polyimides makes the blend of polyethersulfone and aromatic polyimides difficult to be fabricated into gas separation membranes.

The present invention discloses new high permeance copolyimide membranes and methods for making and using these membranes for gas separations.

SUMMARY OF THE INVENTION

The invention discloses high permeance copolyimide membranes and methods for making and using these membranes for gas separations.

The high permeance copolyimide membranes described in the current invention is made from an aromatic random copolyimide polymer comprising a plurality of repeating units of formula (I)

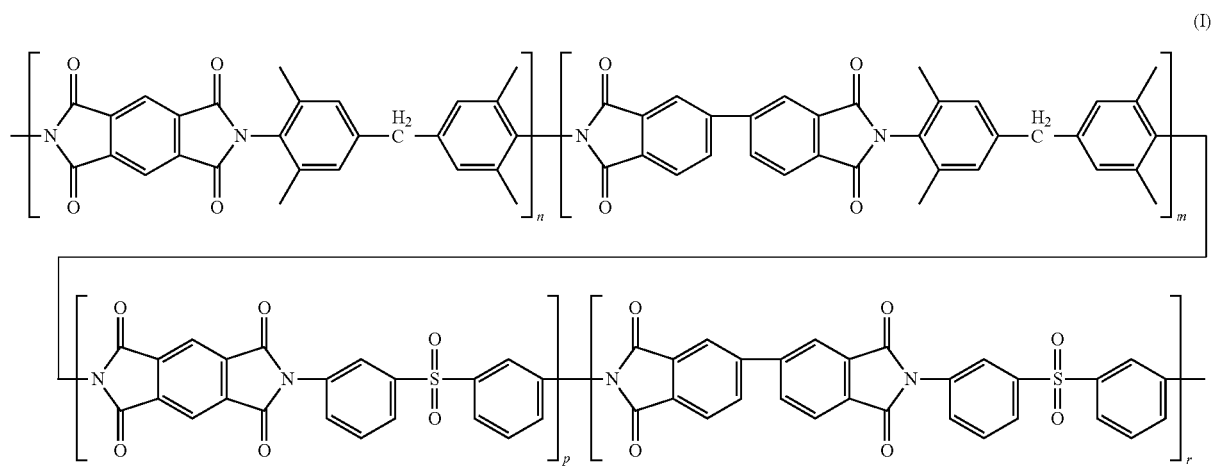

wherein n, m, p, and r are independent integers from 2 to 500; wherein the molar ratio of (n+p)/(m+r) is in a range of 10:1 to 1:10 and the molar ratio of (n+m)/(p+r) is also in a range of 10:1 to 1:10.

The random copolyimide polymers used for making the high permeance copolyimide membranes described in the current invention are poly(pyromelletic dianhydride-3,3',4, 4'-biphenyltetracarboxylic dianhydride-3,3',5,5'-tetramethyl-4,4'-methylene dianiline-3,3'-diaminodiphenyl sulfone)s derived from the polycondensation reaction of a mixture of pyromelletic dianhydride (PMDA) and 3,3',4,4'-biphenyltetracarboxylic dianhydride (BPDA) dianhydride monomers with a mixture of 3,3',5,5'-tetramethyl-4,4'-methylene dianiline (TMMDA) and 3,3'-diaminodiphenyl sulfone (3,3'-DDS) diamine monomers. The molar ratio of PMDA to BPDA is in a range from 10:1 to 1:10. The molar ratio of TMMDA to 3,3'-DDS is also in a range from 10:1 to 1:10.

The random copolyimide polymers used for making the high permeance copolyimide membranes in the current invention have a weight average molecular weight in the range of 20,000 to 1,000,000 Daltons, preferably between 50,000 to 500,000 Daltons.

The high permeance copolyimide membranes described in the present invention can be fabricated into any convenient geometry such as flat sheet (or spiral wound), tube, or hollow fiber.

One high permeance copolyimide membrane described in the present invention is fabricated from poly(pyromelletic dianhydride-3,3',4,4'-biphenyltetracarboxylic dianhydride-3,3',5,5'-tetramethyl-4,4'-methylene dianiline-3,3'-diaminodiphenyl sulfone) with a 3:1 molar ratio of PMDA to BPDA and a 3:1 molar ratio of TMMDA to 3,3'-DDS (abbreviated as poly(PMDA-BPDA-TMMDA-3,3'-DDS-3-1-3-1)) exhibited intrinsic $CO_2$ permeability of 49.5 Barrers and single-gas $CO_2/CH_4$ selectivity of 19.8 for $CO_2/CH_4$ separation at 50° C., under 791 kPa (100 psig) single gas pressure. In another embodiment of the invention, this invention pertains to copolyimide membranes that have undergone an additional UV cross-linking step via exposure of the copolyimide membrane to UV radiation. The sulfonic ($-SO_2-$) groups from 3,3'-DDS and the methyl ($-CH_3$) groups from TMMDA on different main polymer chains of the random copolyimide polymer described in the current invention react with each other under UV radiation to form covalent bonds. Therefore, the cross-linked copolyimide membranes comprise polymer chain segments cross-linked to each other through covalent bonds. The cross-linked copolyimide membrane showed significantly improved selectivity compared to the copolyimide membranes without cross-linking. As an example, the UV cross-linked poly (PMDA-BPDA-TMMDA-3,3'-DDS-3-1-3-1) copolyimide membrane showed an intrinsic single-gas $CO_2/CH_4$ selectivity of 28.4 and a high $CO_2$ permeability of 29.9 Barrers for $CO_2/CH_4$ separation at 50° C., under 791 kPa (100 psig) single gas pressure.

The high permeance copolyimide membranes described in the current invention are useful for a variety of separations and purifications of liquids and gases including separation of acid gases or hydrogen from natural gas, separations of sulfur from hydrocarbon fuels, separations of olefins and paraffins as well as other separations described herein.

DETAILED DESCRIPTION OF THE INVENTION

The present invention is for high permeance copolyimide membranes and methods for making and using these membranes for gas separations.

An embodiment of the present invention is for high permeance copolyimide membranes and UV cross-linked copolyimide membranes prepared from the high permeance copolyimide membranes via UV radiation.

The present invention describes a high permeance copolyimide membrane formed from an aromatic random copolyimide polymer comprising a plurality of repeating units of formula (I)

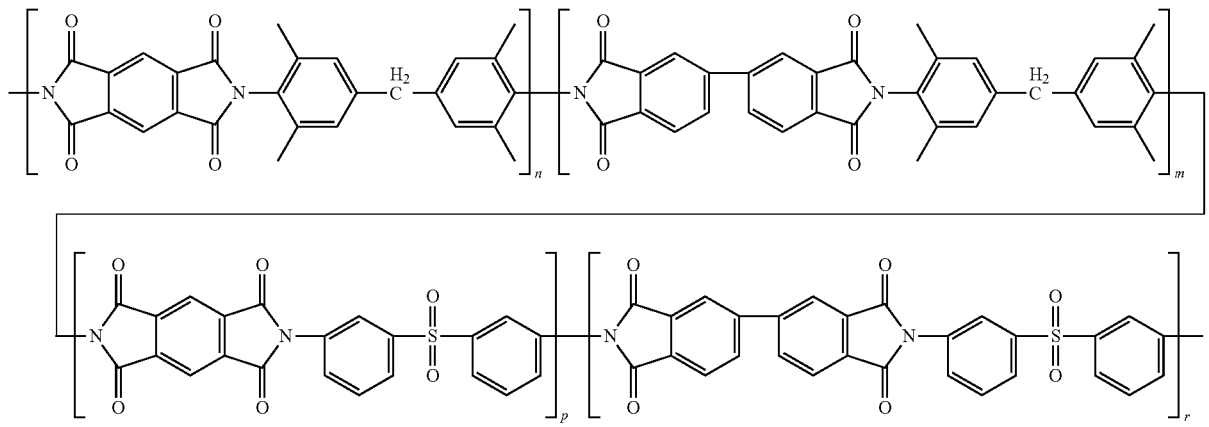

wherein n, m, p, and r are independent integers from 2 to 500; wherein the molar ratio of (n+p)/(m+r) is in a range of 10:1 to 1:10 and the molar ratio of (n+m)/(p+r) is also in a range of 10:1 to 1:10.

The random copolyimide polymers used for making the high permeance copolyimide membranes described in the current invention are poly(pyromelletic dianhydride-3,3',4, 4'-biphenyltetracarboxylic dianhydride-3,3',5,5'-tetramethyl-4,4'-methylene dianiline-3,3'-diaminodiphenyl sulfone)s derived from the polycondensation reaction of a mixture of pyromelletic dianhydride (PMDA) and 3,3',4,4'-biphenyltetracarboxylic dianhydride (BPDA) dianhydride monomers with a mixture of 3,3',5,5'-tetramethyl-4,4'-methylene dianiline (TMMDA) and 3,3'-diaminodiphenyl sulfone (3,3'-DDS) diamine monomers. The molar ratio of PMDA to BPDA is in a range from 10:1 to 1:10. The molar ratio of TMMDA to 3,3'-DDS is also in a range from 10:1 to 1:10.

The random copolyimide polymers used for making the high permeance copolyimide membranes in the current invention have a weight average molecular weight in the range of 20,000 to 1,000,000 Daltons, preferably between 50,000 to 500,000 Daltons.

The high permeance copolyimide membranes described in the present invention can be fabricated into any convenient geometry such as flat sheet (or spiral wound), tube, or hollow fiber.

The current invention further comprises a high permeance copolyimide polymer membrane formed from an aromatic random copolyimide polymer with formula (I) and a process for preparing the high permeance copolyimide polymer membrane. The process for preparing the high permeance copolyimide polymer membrane comprises (a) making an aromatic copolyimide membrane dope solution comprising the aromatic random copolyimide polymer with formula (I), solvents which are miscible with water and can dissolve said aromatic random copolyimide polymer, and non-solvents which cannot dissolve said aromatic random copolyimide polymer; (b) fabricating the aromatic copolyimide membrane in either flat sheet or hollow fiber geometry by casting a thin layer of said aromatic copolyimide membrane dope solution onto a supporting substrate or by spinning said aromatic copolyimide membrane dope solution and a bore fluid simultaneously from an annular spinneret followed by solvent and non-solvent evaporating, coagulating, washing, and drying; and in some cases, (c) coating a high permeability material such as a fluoropolymer, a thermally curable silicone rubber, or a UV radiation curable epoxy silicone onto said aromatic copolyimide membrane.

The membrane dope formulation for the preparation of high permeance aromatic copolyimide membranes for gas separations in the present invention comprises good solvents for the aromatic random copolyimide polymer with formula (I) that can completely dissolve the polymer. Representative good solvents for use in this invention include N-methylpyrrolidone (NMP), N,N-dimethyl acetamide (DMAC), methylene chloride, N,N-dimethylformamide (DMF), dimethyl sulfoxide (DMSO), dioxanes, 1,3-dioxolane, mixtures thereof, others known to those skilled in the art and mixtures thereof. In some cases, the membrane dope formulation for the preparation of the aromatic copolyimide membranes for gas separations in the present invention also comprises poor solvents for the aromatic random copolyimide polymer that cannot dissolve the polymer such as acetone, methanol, ethanol, tetrahydrofuran (THF), toluene, n-octane, n-decane, lactic acid, citric acid, isopropanol, and mixtures thereof. It is believed that the proper weight ratio of the solvents used in the present invention provides asymmetric aromatic copolyimide membranes with <200 nm super thin nonporous selective skin layer which results in high permeance.

The invention further comprises a UV cross-linked aromatic copolyimide membrane formed from an aromatic copolyimide membrane described in the present invention. The UV cross-linked aromatic copolyimide membrane is prepared by UV cross-linking of the aromatic copolyimide membrane via UV radiation. The aromatic random copolyimide polymers used for the preparation of the aromatic copolyimide membranes described in the current invention have UV cross-linkable sulfonyl and methyl functional groups. The UV cross-linked aromatic copolyimide membranes comprise random copolyimide polymer chain segments where at least part of these polymer chain segments are cross-linked to each other through possible direct covalent bonds by exposure to UV radiation. The cross-linking of the aromatic copolyimide membranes provides the membranes with improved selectivities and slightly decreased permeances compared to the corresponding uncross-linked aromatic copolyimide membranes.

The aromatic copolyimide membranes and the UV cross-linked aromatic copolyimide membranes of the invention may be fabricated into any known membrane configuration or form such as flat sheet or hollow fiber.

The invention also involves a process for separating at least one gas from a mixture of gases comprising providing the aromatic copolyimide membrane or the UV cross-linked aromatic copolyimide membrane described in the present invention; contacting the mixture of gases to one side of the aromatic copolyimide membrane or the UV cross-linked aromatic copolyimide membrane to cause at least one gas to permeate said membrane; and removing from an opposite side of said aromatic copolyimide membrane or the UV cross-linked aromatic copolyimide membrane a permeate gas composition comprising a portion of said at least one gas that permeated said membrane.

The aromatic copolyimide membrane or the UV cross-linked aromatic copolyimide membrane described in the present invention is especially useful in the purification, separation or adsorption of a particular species in the liquid or gas phase. In addition to separation of pairs of gases, the aromatic copolyimide membrane or the UV cross-linked aromatic copolyimide membrane described in the present invention may, for example, be used for the desalination of water by reverse osmosis or for the separation of proteins or other thermally unstable compounds, e.g. in the pharmaceutical and biotechnology industries. The aromatic copolyimide membrane or the UV cross-linked aromatic copolyimide membrane described in the present invention may also be used in fermenters and bioreactors to transport gases into the reaction vessel and transfer cell culture medium out of the vessel. Additionally, the aromatic copolyimide membrane or the UV cross-linked aromatic copolyimide membrane described in the present invention may be used for the removal of microorganisms from air or water streams, water purification, ethanol production in a continuous fermentation/membrane pervaporation system, and in detection or removal of trace compounds or metal salts in air or water streams.

The aromatic copolyimide membrane or the UV cross-linked aromatic copolyimide membrane described in the present invention is especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of He, $CO_2$ or $H_2S$ from natural gas, $H_2$ from $N_2$, $CH_4$, and Ar in ammonia purge gas streams, $H_2$ recovery in refineries, olefin/paraffin separations such as propylene/propane separation, xylene separations, iso/normal paraffin separations, liquid natural gas separations, $C_2+$ hydrocarbon recovery. Any given pair or group of gases that differ in molecular size, for example nitrogen and oxygen, carbon dioxide and methane, hydrogen and methane or carbon monoxide, helium and methane, can be separated using the aromatic copolyimide membrane or the UV cross-linked aromatic copolyimide membrane described in the present invention. More than two gases can be removed from a third gas. For example, some of the gas components which can be selectively removed from a raw natural gas using the aromatic copolyimide membrane or the UV cross-linked aromatic copolyimide membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 70 kPa or as high as 14.5 MPa (about 10 psi or as high as about 2100 psi) depending on many factors such as the particular membrane used, the flow rate of the inlet stream and the availability of a compressor to compress the permeate stream if such compression is desired. Differential pressure greater than about 14.5 MPa (2100 psi) may rupture the membrane. A differential pressure of at least 0.7 MPa (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the membranes of the present invention will range from about −50° to about 150° C. More preferably, the effective operating temperature of the aromatic copolyimide membrane or the UV cross-linked aromatic copolyimide membrane of the present invention will range from about −20° to about 100° C., and most preferably, the effective operating temperature of the membranes of the present invention will range from about 25° to about 100° C.

The aromatic copolyimide membrane or the UV cross-linked aromatic copolyimide membrane described in the present invention are also especially useful in gas/vapor separation processes in chemical, petrochemical, pharmaceutical and allied industries for removing organic vapors from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which the aromatic copolyimide membrane or the UV cross-linked aromatic copolyimide membrane described in the present invention may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The aromatic copolyimide membrane or the UV cross-linked aromatic copolyimide membrane described in the present invention may incorporate a species that adsorbs strongly to certain gases (e.g. cobalt porphyrins or phthalocyanines for $O_2$ or silver (I) for ethane) to facilitate their transport across the membrane.

The aromatic copolyimide membrane or the UV cross-linked aromatic copolyimide membrane described in the present invention also has immediate application to concentrate olefin in a paraffin/olefin stream for olefin cracking application. For example, the aromatic copolyimide membrane or the UV cross-linked aromatic copolyimide membrane described in the present invention can be used for propylene/propane separation to increase the concentration of the effluent in a catalytic dehydrogenation reaction for the production of propylene from propane and isobutylene from isobutane. Therefore, the number of stages of a propylene/propane splitter that is required to get polymer grade propylene can be reduced. Another application for the aromatic copolyimide membrane or the UV cross-linked aromatic copolyimide membrane described in the present invention is for separating isoparaffin and normal paraffin in light paraffin isomerization and MaxEne™, a process from UOP LLC, Des Plaines, Ill., for enhancing the concentration of normal paraffin (n-paraffin) in the naphtha cracker feedstock, which can be then converted to ethylene.

The aromatic copolyimide membrane or the UV cross-linked aromatic copolyimide membrane described in the present invention can also be operated at high temperature to provide the sufficient dew point margin for natural gas upgrading (e.g, $CO_2$ removal from natural gas). The aromatic copolyimide membrane or the UV cross-linked aromatic copolyimide membrane described in the present invention can be used in either a single stage membrane or as the first or/and second stage membrane in a two stage membrane system for natural gas upgrading.

The aromatic copolyimide membrane or the UV cross-linked aromatic copolyimide membrane described in the present invention may also be used in the separation of liquid mixtures by pervaporation, such as in the removal of organic compounds (e.g., alcohols, phenols, chlorinated hydrocarbons, pyridines, ketones) from water such as aqueous effluents or process fluids. A membrane which is ethanol-selective would be used to increase the ethanol concentration in relatively dilute ethanol solutions (5-10% ethanol) obtained by fermentation processes. Another liquid phase separation example using the aromatic copolyimide membrane or the UV cross-linked aromatic copolyimide membrane described in the present invention is the deep desulfurization of gasoline and diesel fuels by a pervaporation membrane process similar to the process described in U.S. Pat. No. 7,048,846, incorporated by reference herein in its entirety. The aromatic copolyimide membrane or the UV cross-linked aromatic copolyimide membrane described in the present invention that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the aromatic copolyimide membrane or the UV cross-linked aromatic copolyimide membrane described in the present invention include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropyl-ether-isopropanol, methanol-ethanol-isopropanol, and ethylacetate-ethanol-acetic acid.

EXAMPLES

The following examples are provided to illustrate one or more preferred embodiments of the invention, but are not limited embodiments thereof. Numerous variations can be made to the following examples that lie within the scope of the invention.

Example 1

Preparation and Evaluation of Poly(PMDA-BPDA-TMMDA-3,3'-DDS-3-1-3-1) Copolyimide Dense Film Membrane from Poly(PMDA-BPDA-TMMDA-3,3'-DDS-3-1-3-1) Random Copolyimide 10.0 g of poly(PMDA-BPDA-TMMDA-3,3'-DDS-3-1-3-1) random copolyimide synthesized from polycondensation reaction of PMDA and BPDA with TMMDA and 3,3'-DDS (PMDA/BPDA=3:1 and TMMDA/3,3'-DDS=3:1 molar ratio) was dissolved in 40.0 g of NMP. The mixture was mechanically stirred for 2 hours to form a homogeneous casting dope. The resulting homogeneous casting dope was allowed to degas overnight. The poly(PMDA-BPDA-TMMDA-3,3'-DDS-3-1-3-1) copolyimide dense film membrane was prepared from the bubble free casting dope on a clean glass plate using a doctor knife with a 18-mil gap. The dense film membrane together with the glass plate was then put into a vacuum oven. The solvents were removed by slowly increasing the vacuum and the temperature of the vacuum oven. Finally, the dense film membrane was heated at 200° C. under vacuum for 48 hours to completely remove the residual solvents.

The poly(PMDA-BPDA-TMMDA-3,3'-DDS-3-1-3-1) copolyimide dense film membrane and the UV cross-linked poly(PMDA-BPDA-TMMDA-3,3'-DDS-3-1-3-1) copolyimide dense film membrane were tested for $CO_2/CH_4$ separation at 50° C. under 791 kPa (100 psig) single feed gas pressure. The results in the following table show that BPDA-TMMDA-HAB-3-1-3-1 copolyimide dense film membrane has $CO_2$ permeability of 49.5 Barrers and $CO_2/CH_4$ selectivity of 19.8 for $CO_2/CH_4$ separation. The UV cross-linked poly(PMDA-BPDA-TMMDA-3,3'-DDS-3-1-3-1) copolyimide dense film membrane has a intrinsic $CO_2/CH_4$ selectivity of 28.4 and a $CO_2$ permeability of 29.9 Barrers for $CO_2/CH_4$ separation.

TABLE 1

Pure gas permeation test results of poly (PMDA-BPDA-TMMDA-3,3'-DDS-3-1-3-1) copolyimide dense film membrane and the UV cross-linked poly (PMDA-BPDA-TMMDA-3,3'-DDS-3-1-3-1) copolyimide dense film membrane for $CO_2/CH_4$, $H_2/CH_4$ and propylene/propane separations *

| Dense film membrane | $P_{CO2}$ (Barrer) | $\alpha_{CO2/CH4}$ | $P_{H2}$ (Barrer) | $\alpha_{H2/CH4}$ | $P_{propylene}$ (Barrer) | $\alpha_{propylene/propane}$ |
|---|---|---|---|---|---|---|
| Poly(PMDA-BPDA-TMMDA-3,3'-DDS-3-1-3-1) dense film | 49.5 | 19.8 | 98.8 | 39.5 | 3.35 | 22.4 |
| UV cross-linked Poly(PMDA-BPDA-TMMDA-3,3'-DDS-3-1-3-1) dense film | 29.9 | 28.4 | 69.9 | 66.5 | — | — |

Membranes were tested at 50° C. and 791 kPa (100 psig) for all the single gases.
* 1 Barrer = $10^{-10}$ cm$^3$ (STP) · cm/cm$^2$ · sec · cmHg.

Example 2

Preparation of Poly(PMDA-BPDA-TMMDA-3,3'-DDS-3-1-3-1) Asymmetric Hollow Fiber Membrane A poly(PMDA-BPDA-TMMDA-3,3'-DDS-3-1-3-1) asymmetric hollow fiber membrane was prepared from a spinning dope comprising 20.5 g of poly(PMDA-BPDA-TMMDA-3,3'-DDS-3-1-3-1), 2.5 g of 1,3-dioxolane and 66.3 g of NMP. The poly(PMDA-BPDA-TMMDA-3,3'-DDS-3-1-3-1) spinning dope was extruded from the annulus of a hollow fiber membrane spinneret at a flow rate of 3.0 mL/min. At the same time, a bore solution of 10 wt % $H_2O$/90 wt % NMP flowed from the inner passage of the spinneret at 0.6 mL/min to keep the nascent fiber from collapsing. During extrusion, the dope and spinneret were controlled at 50° C. The nascent fiber passed through an air gap of 10 cm and then entered a water coagulation bath at approximately 0° C. Finally, the solidified hollow fiber membrane was wound on a take-up drum partially submersed in room temperature water at 23.5 m/min. The newly formed hollow fibers from each set of membranes were treated in 85° C. water for 30 min then soaked in a water bath at room temperature overnight. Then, the fibers were submersed in three successive volumes of methanol for 10 min each, followed by submersion in three successive volumes of hexane for 10 min each. Next, the fibers were dried for 1 hour at 100° C., and then a bundle of 8 hollow fibers was sealed into a stainless steel module for gas permeation testing.

Example 3

Preparation of Epoxysilicone-Coated and UV Cross-Linked Poly(PMDA-BPDA-TMMDA-3,3'-DDS-3-1-3-1) Asymmetric Hollow Fiber Membrane Poly(PMDA-BPDA-TMMDA-3,3'-DDS-3-1-3-1) asymmetric hollow fibers prepared in Example 2 were dip-coated with a 5 wt % of epoxysilicone solution in a mixture of heptane and hexane solvents and UV treated for 2.5 min. Ten of the epoxysilicone-coated and UV cross-linked poly (PMDA-BPDA-TMMDA-3,3'-DDS-3-1-3-1) asymmetric hollow fibers were bundled together and sealed into a stainless steel module for gas permeation testing.

Example 4

Evaluation of $CO_2/CH_4$ Separation Performance of Poly(PMDA-BPDA-TMMDA-3,3'-DDS-3-1-3-1) Asymmetric Hollow Fiber Membrane and Epoxysilicone-Coated and UV Cross-Linked Poly(PMDA-BPDA-TMMDA-3,3'-DDS-3-1-3-1) Asymmetric Hollow Fiber Membrane The poly(PMDA-BPDA-TMMDA-3,3'-DDS-3-1-3-1) asymmetric hollow fiber membrane and epoxysilicone-coated and UV cross-linked poly(PMDA-BPDA-TMMDA-3,3'-DDS-3-1-3-1) asymmetric hollow fiber membrane were tested for $CO_2/CH_4$ separation at 50° C. under both single gas and mixed gas testing conditions. The $CO_2$ and $CH_4$ single gas tests were performed under 791 kPa (100 psig) pressure and the results are shown in Table 2. The $CO_2/CH_4$ mixed gas tests were performed under 2170 kPa (300 psig) and 4238 kPa (600 psig) feed gas pressures with 10% of $CO_2$ and 90% of $CH_4$ in the feed, respectively. The results are shown in Table 3. As shown in Table 2, the poly(PMDA-BPDA-TMMDA-3,3'-DDS-3-1-3-1) asymmetric hollow fiber membrane showed super high $CO_2$ permeance of 1218 GPU and moderate $CO_2/CH_4$ selectivity of 9.1 for $CO_2/CH_4$ separation at 50° C. under 791 kPa singe gas testing conditions. The membrane showed significantly enhanced $CO_2/CH_4$ selectivity after epoxysilicone coating and UV cross-linking for $CO_2/CH_4$ separation at 50° C. under 791 kPa singe gas testing conditions. The epoxysilicone-coated and UV cross-linked poly(PMDA-BPDA-TMMDA-3,3'-DDS-3-1-3-1) asymmetric hollow fiber membrane also showed high $CO_2$ permeance of 165 GPU and high $CO_2/CH_4$ selectivity of 22.7 at 50° C. under 4238 kPa high feed pressure with 10% $CO_2$ and 90% $CH_4$ in the feed gas as shown in Table 3.

TABLE 2

Single gas $CO_2/CH_4$ separation performance of poly(PMDA-BPDA-TMMDA-3,3'-DDS-3-1-3-1) asymmetric hollow fiber membrane and epoxysilicone-coated and UV cross-linked poly(PMDA-BPDA-TMMDA-3,3'-DDS-3-1-3-1) asymmetric hollow fiber membrane

| Hollow fiber membrane | $CO_2$ permeance (GPU) | $CO_2/CH_4$ selectivity |
|---|---|---|
| Poly(PMDA-BPDA-TMMDA-3,3'-DDS-3-1-3-1) hollow fiber membrane | 1217.9 | 9.10 |
| Epoxysilicone-coated and UV cross-linked poly(PMDA-BPDA-TMMDA-3,3'-DDS-3-1-3-1) hollow fiber membrane | 356.9 | 35.7 |

* 1 GPU = $10^{-6}$ $cm^3$ (STP)/$cm^2$ s (cm Hg)
* Testing conditions: 50° C., 791 kPa (100 psig) single gas pressure.

TABLE 3

Mixed gas $CO_2/CH_4$ separation performance of poly(PMDA-BPDA-TMMDA-3,3'-DDS-3-1-3-1) asymmetric hollow fiber membrane and epoxysilicone-coated and UV cross-linked poly(PMDA-BPDA-TMMDA-3,3'-DDS-3-1-3-1) asymmetric hollow fiber membrane

| Hollow fiber membrane | $CO_2$ permeance (GPU) | $CO_2/CH_4$ selectivity |
|---|---|---|
| Epoxysilicone-coated and UV cross-linked poly(PMDA-BPDA-TMMDA-3,3'-DDS-3-1-3-1) hollow fiber membrane[a] | 203.0 | 25.1 |
| Epoxysilicone-coated and UV cross-linked poly(PMDA-BPDA-TMMDA-3,3'-DDS-3-1-3-1) hollow fiber membrane[b] | 165.3 | 22.7 |

* 1 GPU = $10^{-6}$ $cm^3$ (STP)/$cm^2$ s (cm Hg)
* Testing conditions:
[a] 50° C., 2170 kPa (300 psig), 10% $CO_2$ and 90% of $CH_4$ in the feed;
[b] 50° C., 4238 kPa (600 psig), 10% $CO_2$ and 90% of $CH_4$ in the feed.

The invention claimed is:
1. A copolyimide membrane comprising an aromatic random copolyimide polymer comprising a plurality of repeating units of formula (I)

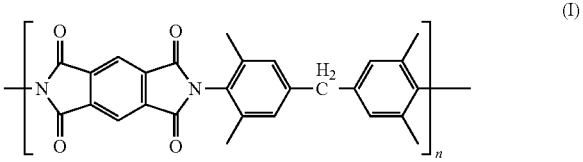

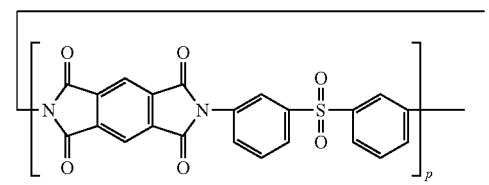

-continued

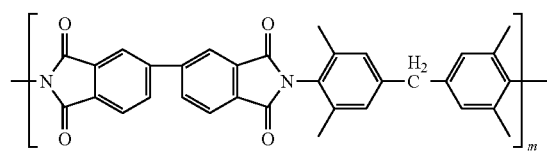

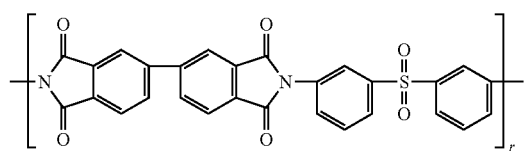

wherein n, m, p, and r are independent integers from 2 to 500; wherein the molar ratio of (n+p)/(m+r) is 3:1 and the molar ratio of (n+m)/(p+r) is 3:1 wherein said copolyimide membrane is cross-linked by exposure to UV radiation.

2. The copolyimide membrane of claim 1 wherein the copolyimide membranes are fabricated into a geometry selected from the group consisting of flat sheet, spiral wound, tube, or hollow fiber.

3. A process for preparing a copolyimide polymer membrane comprising
   (a) making an aromatic copolyimide membrane dope solution comprising an aromatic random copolyimide polymer, solvents which are miscible with water and can dissolve said aromatic random copolyimide polymer, and non-solvents which cannot dissolve said aromatic random copolyimide polymer, wherein said aromatic random copolyimide polymer comprises a plurality of repeating units of formula (I)

wherein n, m, p, and r are independent integers from 2 to 500; wherein the molar ratio of (n+p)/(m+r) is 3:1 and the molar ratio of (n+m)/(p+r) is 3:1;
   (b) fabricating said copolyimide membrane in either flat sheet or hollow fiber geometry by casting a thin layer of said aromatic copolyimide membrane dope solution onto a supporting substrate or by spinning said aromatic copolyimide membrane dope solution and a bore fluid simultaneously from an annular spinneret followed by solvent and non-solvent evaporating, coagulating, washing, and drying; and
   (c) cross-linking said copolyimide membrane by exposure to UV radiation.

4. The process of claim 3 further comprising coating a high permeability material comprising a fluoropolymer, a thermally curable silicone rubber, or a UV radiation curable epoxy silicone onto said copolyimide membrane.

5. The process of claim 3 wherein said solvent is selected from the group consisting of N-methylpyrrolidone, N,N-dimethyl acetamide, methylene chloride, N,N-dimethylformamide, dimethyl sulfoxide, dioxanes, 1,3-dioxolane, and mixtures thereof.

6. The process of claim 3 wherein said non-solvents are selected from the group consisting of acetone, methanol, ethanol, tetrahydrofuran, toluene, n-octane, n-decane, lactic acid, citric acid, isopropanol, and mixtures thereof.

7. A method for separating at least one gas from a mixture of gases comprising providing a copolyimide membrane comprising an aromatic random copolyimide polymer with a plurality of repeating units of formula (I)

(I)

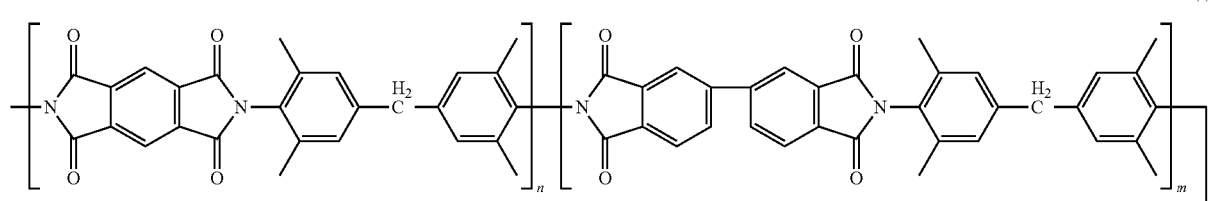

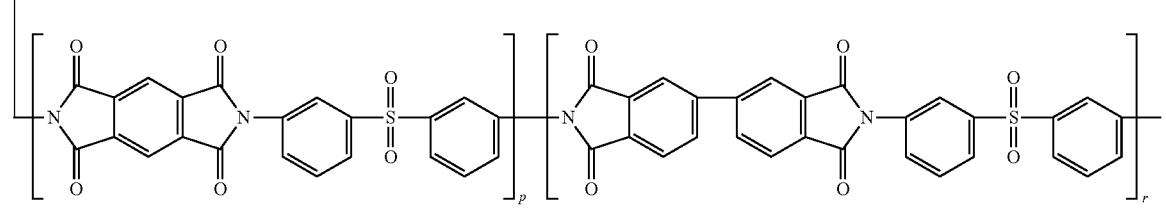

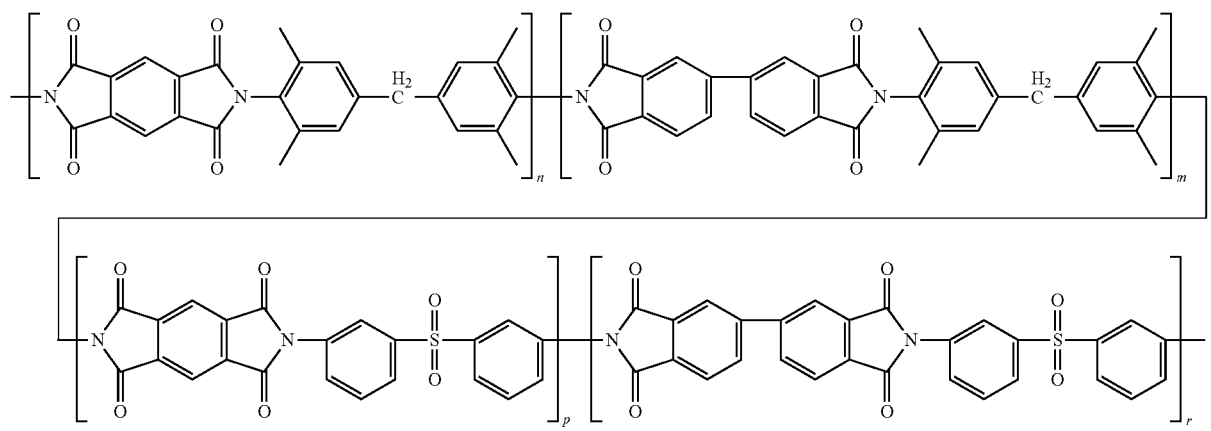

wherein n, m, p, and r are independent integers from 2 to 500; wherein the molar ratio of (n+p)/(m+r) is 3:1 and the molar ratio of (n+m)/(p+r) is 3:1 and wherein said copolyimide membrane is cross-linked by exposure to UV radiation contacting the mixture of gases to one said UV cross-linked copolyimide membrane to cause at least one gas to permeate said membrane; and removing from an opposite side of said UV cross-linked copolyimide membrane a permeate gas composition comprising a portion of said at least one gas that permeated said membrane.

8. The method of claim 7 wherein said mixture of gases comprises a mixture of volatile organic compounds in an atmospheric gas.

9. The method of claim 7 wherein said mixture of gases comprises helium, carbon dioxide or hydrogen sulfide in natural gas.

10. The method of claim 7 wherein said mixture of gases comprises hydrogen, nitrogen, methane and argon or hydrogen from a refinery stream.

11. The method of claim 7 wherein said mixture of gases comprises olefin/paraffin separations selected from the group consisting of propylene/propane separations, xylene separations, and iso/normal paraffin separations.

12. The method of claim 7 wherein said mixture of gases is selected from the group consisting of nitrogen and oxygen, carbon dioxide and methane, hydrogen and methane or carbon monoxide, helium and methane.

13. The method of claim 7 wherein said mixture of gases is selected from the group consisting of carbon dioxide, oxygen, nitrogen, water vapor, hydrogen sulfide, helium, and other trace gases in a raw natural gas feed.

14. The method of claim 7 wherein said copolyimide membrane is in a single stage membrane or in a first or second stage membrane of a two stage membrane system.

15. The method of claim 7 wherein said membrane is further used in separation of liquid mixtures by pervaporation.

16. The method of claim 15 wherein said liquid mixtures are selected from the group consisting of organic compounds in water; sulfur compounds in gasoline or diesel fuels; or mixtures of organic compounds selected from the group consisting of ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

* * * * *